United States Patent
Zelander et al.

(10) Patent No.: US 6,548,092 B2
(45) Date of Patent: Apr. 15, 2003

(54) METHOD AND DEVICE FOR HANDLING BAKED PRODUCTS

(75) Inventors: Björn Zelander, Mölndal (SE); Glenn Clemendor, Mölndal (SE)

(73) Assignee: Santa Maria AB, Mölndal (SE)

( * ) Notice: Subject to any disclaimer, the term of this patent is extended or adjusted under 35 U.S.C. 154(b) by 0 days.

(21) Appl. No.: 09/749,811

(22) Filed: Dec. 28, 2000

(65) Prior Publication Data

US 2001/0011503 A1 Aug. 9, 2001

(30) Foreign Application Priority Data

Jan. 13, 2000 (SE) .............................. 0000082

(51) Int. Cl.[7] .............................................. A21C 15/00
(52) U.S. Cl. ...................... 426/233; 426/233; 426/560; 426/389; 426/523; 99/404; 99/407; 99/443 C
(58) Field of Search ................. 99/450.6, 484, 99/353, 646 R, 443 C, 404, 407; 426/231, 549, 560, 389, 233, 523

(56) References Cited

U.S. PATENT DOCUMENTS

| | | | | |
|---|---|---|---|---|
| 3,267,836 A | * | 8/1966 | Yepis | 99/404 |
| 3,570,393 A | * | 3/1971 | Schy | 99/404 |
| 3,602,130 A | * | 8/1971 | Perez | 99/404 |
| 3,667,372 A | | 6/1972 | Hilvitz et al. | 99/404 |
| 3,763,764 A | * | 10/1973 | Schy | 99/353 |
| 3,766,846 A | * | 10/1973 | Jimenez | 99/353 |
| 3,946,655 A | * | 3/1976 | Schy | 99/404 |
| 4,554,865 A | * | 11/1985 | Caridis et al. | 99/353 |
| 4,753,336 A | * | 6/1988 | Taylor et al. | 198/560 |
| 4,760,775 A | * | 8/1988 | Hoskins | 99/353 |
| 5,743,174 A | | 4/1998 | Stickle | 99/404 |

* cited by examiner

Primary Examiner—Keith Hendricks
Assistant Examiner—Drew Becker
(74) Attorney, Agent, or Firm—Burns, Doane, Swecker & Mathis, L.L.P.

(57) ABSTRACT

The invention relates to a method for separating and delivering, orderly positioned, stiff folded baked products, such as taco shells, from a first conveyor (1), the baked products on said first conveyor resting on carrier means (6), which are preferably adapted to the shape of the baked products, a relative motion being imparted to the respective baked products (12) in relation to the associated carrier means (6) by a separating means (13) being brought into contact with the baked product, preferably from below, to separate the baked product from the carrier means before it is delivered to a delivery station. According to the invention, the respective baked products (12) are separated from the associated carrier means (6) by the baked product being caused to slide, during its transport motion (7), towards a surface portion (14) of the separating means (13), which surface portion is inclined relative to the transport motion of the carrier means.

18 Claims, 5 Drawing Sheets

METHOD AND DEVICE FOR HANDLING BAKED PRODUCTS

The present invention relates to a method and a device for separating and delivering, orderly positioned, stiff folded baked products, such as taco shells, from a first conveyor, the baked products on said first conveyor resting on carrier means, which are preferably adapted to the shape of the baked products, a relative motion being imparted to the respective baked products in relation to the associated carrier means by a separating means being brought into contact with the baked product, preferably from below, to separate the baked product from the carrier means before it is delivered to a delivery station.

A conveyor of the above-mentioned kind is known, for instance, from U.S. Pat. No. 5,743,174. This publication discloses a conveying device, by means of which taco shells are conveyed hanging over ridge-like carrier means made of wire grating. This type of conveying device is generally used to convey taco shells through a frying device.

Due to the great amount of fat in the frying step, the taco shells easily get stuck on and between the wires of the carrier means. As a result, it is difficult to remove the taco shells from the carrier means. These difficulties are aggravated if the taco shells are, for instance, covered with cheese, which makes the taco shells even more inclined to stick to the carrier means. Besides the fact that the taco shells easily get stuck on the carrier means, the shells are very fragile after frying and may therefore easily break, for instance, when they are removed from the carrier means or when they fall down on a handling table or on a second conveyor for further transport. Taco shells that are coming loose from the carrier means only due to their own weight in tilting of the carrier means are delivered in an uncontrolled and disorderly manner. This makes the further handling of the taco shells more difficult. As a result, the further handling of the taco shells, such as bundling and packaging, is mostly manual.

The main object of the invention is to obviate the above-mentioned problems and enable safe and orderly handling of the baked products. More specifically, the object of the invention is to enable orderly separation of the baked products from the carrier means without any need for manual work, which in turn facilitates safe continued handling of the baked products, e.g. in bundling and packaging.

This object is achieved by a method according to the invention which is mainly characterised in that the separation of the respective baked products from the associated carrier means is effected by the baked product, during its transport motion, being caused to slide towards a surface portion of the separating means, which surface portion is inclined relative to the transport motion of the carrier means. To carry out this method use can, according to the invention, be made of a device which is characterised in that the separating means has a guiding edge portion, which is inclined relative to the path of motion of the carrier means and which is arranged to form a sliding bar that is engageable from below with the baked products during the transport thereof on the carrier means.

By this arrangement, the baked products are separated in an active and controllable manner from the carrier means, which allows controllable delivery in an orderly manner, which also facilitates the subsequent handling. Additional features and advantages of the invention are stated in the appended dependent claims.

According to a preferred embodiment of the invention, a distance is provided between the baked products and the carrier means in the first conveyor, which allows a support means to be introduced into the space formed by this distance, and the baked products can thus be lifted from the carrier means in an efficient manner for further transport and other types of handling. The features stated in the dependent claims also define a method and a device for safe and efficient handling of brittle and fragile baked products, such as primarily taco shells.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
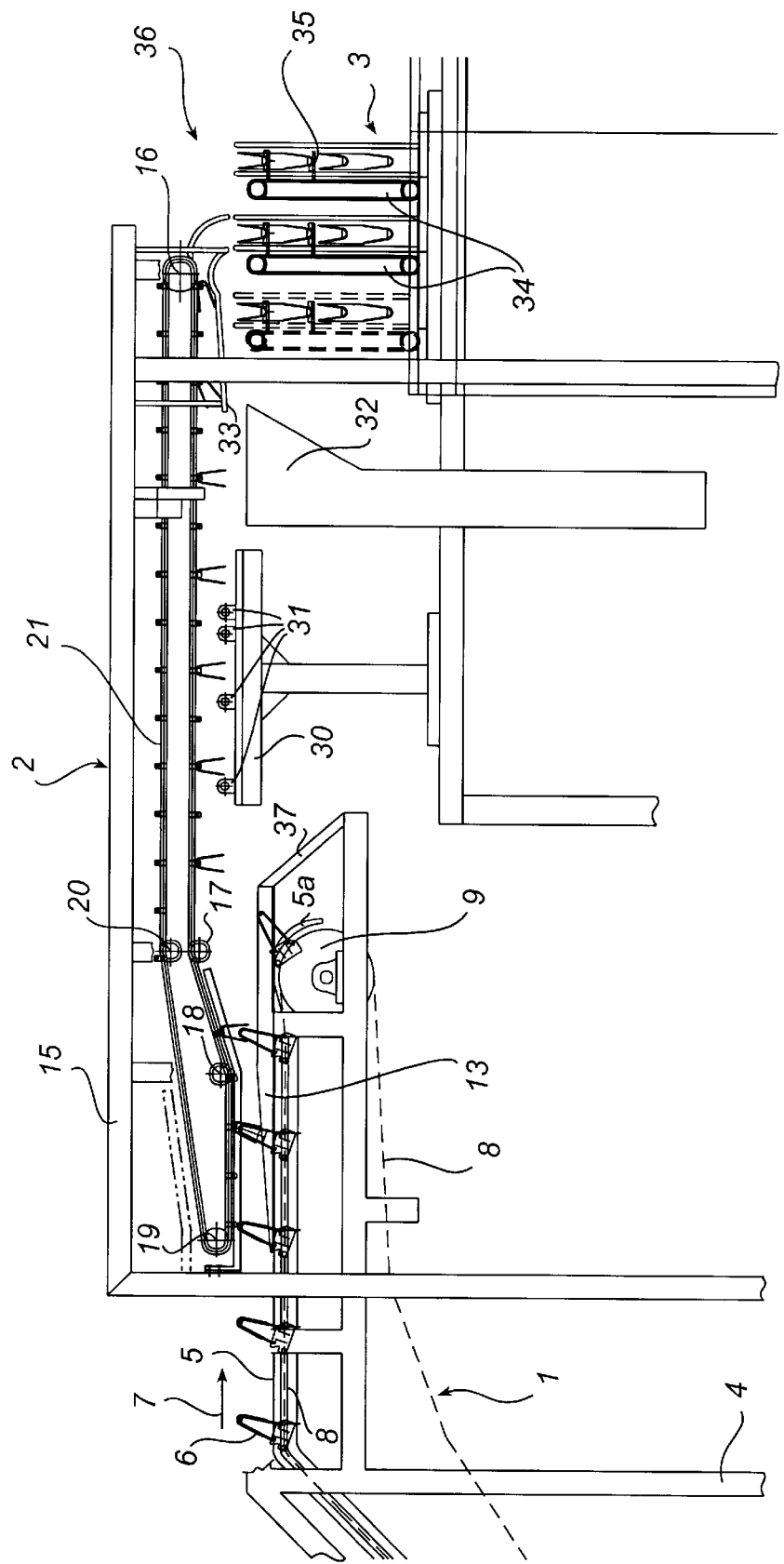
FIG. 1 is a side view of an embodiment of a handling device according to the invention.
Figure 3:
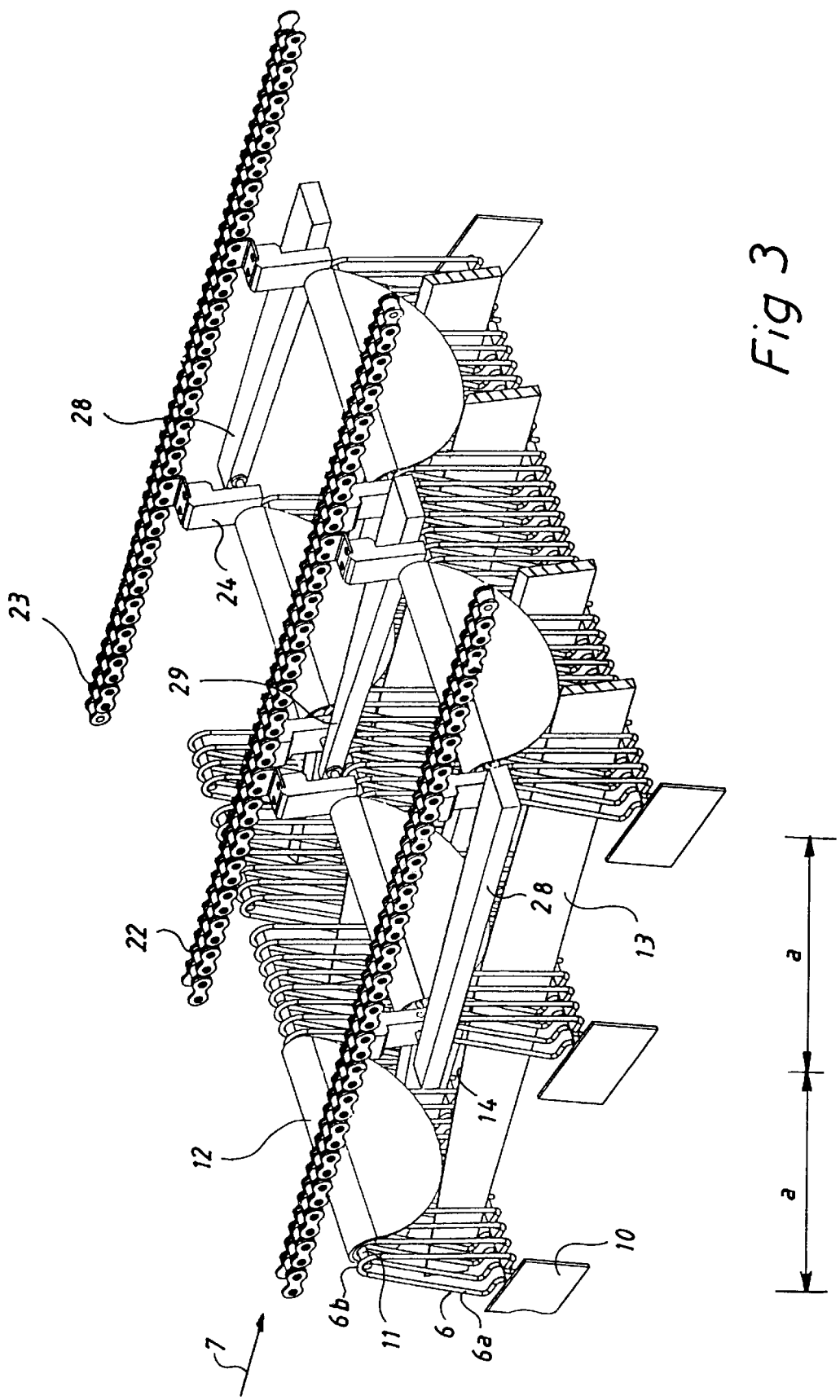
FIG. 3 is a perspective view of a portion that is included in the device according to FIG. 1, FIGS. 4–5 show on an enlarged scale a detail in a first working position, which detail is included in the device according to FIG. 1.

A first conveyor, which in FIG. 1 is generally designated 1, can be constructed in a manner that is essentially similar to that of the conveyor disclosed in U.S. Pat. No. 5,743,174. The shown example concerns the outlet end of a conveyor which is adapted to convey taco shells through a frying installation. As such a frying installation and conveyor belong to prior-art technique, they will not be described in their entirety. Reference numeral 2 generally designates a second conveyor for taking over taco shells from the first conveyor and further conveyance thereof to a collecting device generally designated 3. The conveyor 1 is composed of a frame 4, on which a conveying path 5 is arranged, along which a number of carrier means 6 are movable in the direction indicated by an arrow 7 in FIG. 1. Reference numeral 8 designates a flexible driving and spacing means, which is laid around a deflecting roller 9 or the like arranged at the end of the conveyor. In the shown embodiment, each of the carrier means constitutes a wire structure, which is formed with a ridge-shape and whose structure is best seen in FIG. 3. Reference numeral 10 designates an orienting means, which is schematically shown in FIG. 3 and to which the carrier means 6 are attached. The orienting means is attached to the driving/spacing means 8 which can be a chain, a flexible netting construction, a band or the like arranged in a predetermined spaced-apart relationship a. Furthermore, the orienting means can have a pin engaging in a groove 5a in the conveying path. As appears from FIG. 1, the carrier means can thus be made to take an angular position, which varies along the conveying path, i.e. an angular position which is not necessarily dependent on the extension of the driving means 8. As best seen in FIG. 3, the carrier means are composed of a number of parallel spaced-apart wire bows 6 which are arranged in vertical planes coinciding with the direction of transport. In their upper portion, the wire bows have a top portion 6b and in their lower portion they have legs 6a which are attached to the orienting means 10. Reference numeral 11 designates bars which extend in the transverse direction of the conveyor and which in groups connect a number of top portions 6b of the wire bows so that they together form ridges extending in the transverse direction of the conveyor. FIG. 3 shows in perspective taco shells 12 which are hanging over these ridges and which, in operation of the device, move in the direction of the arrow 7 hanging over the drivers 6. In the embodiment shown in FIG. 3, two rows of taco shells are conveyed side by side. For improved clarity, certain portions of the remote part of the conveyor as well as the taco shells hanging thereon have been removed.

Figure 2:
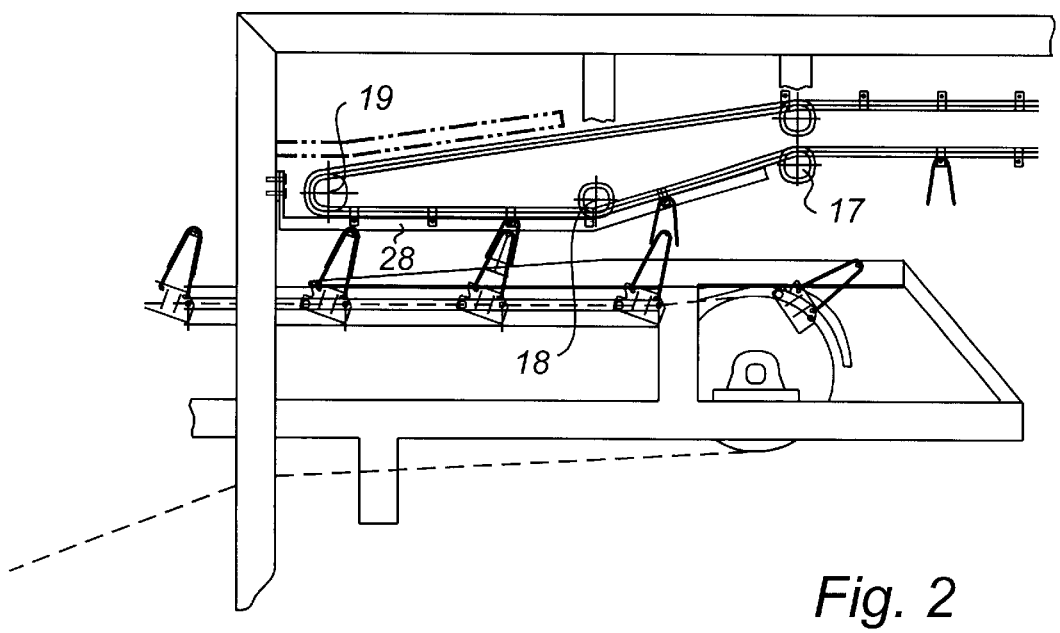
FIG. 2 shows on an enlarged scale a portion that is included in the device according to FIG. 1.
Figure 4:
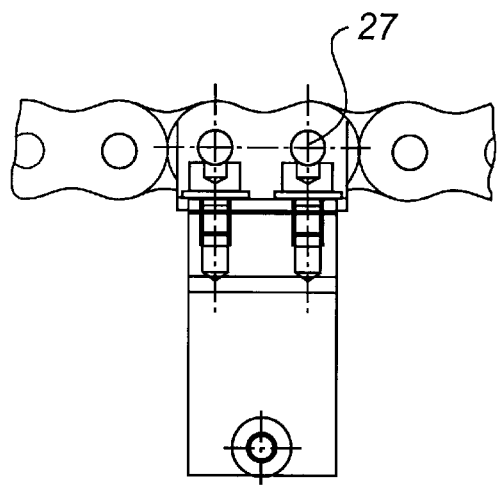
Figure 5:
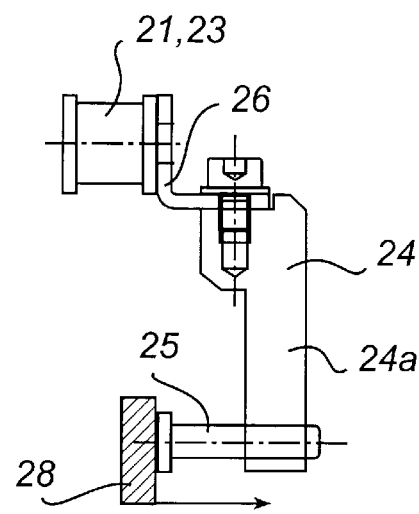
Figure 6:
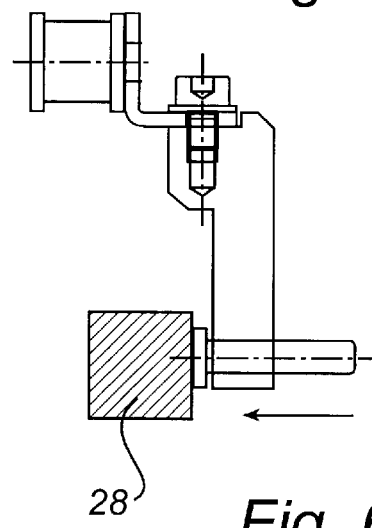
FIG. 6 shows the same detail as in FIGS. 4–5 in a second working position.
Figure 7:
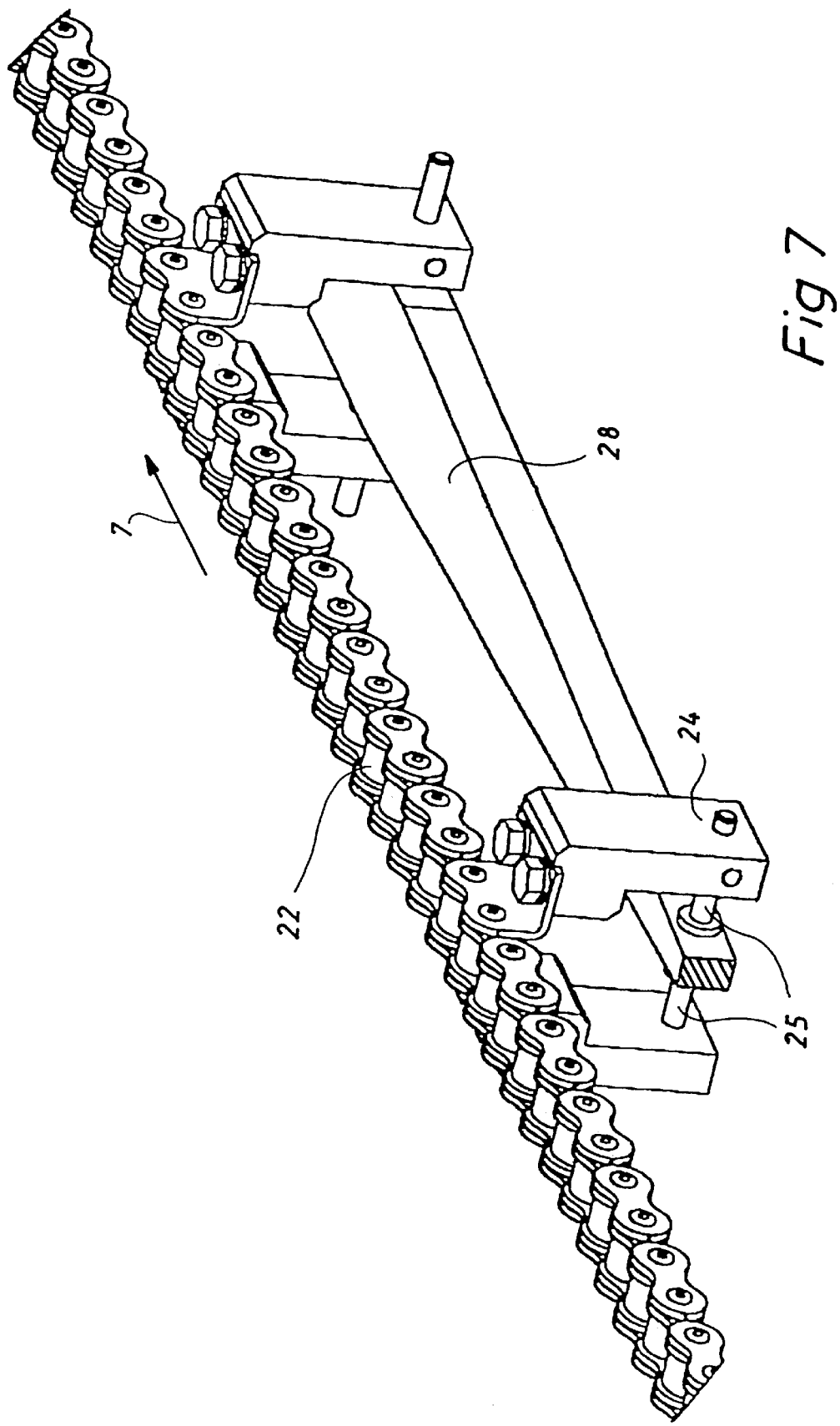
FIG. 7 is a partial perspective view of two details, which are successively arranged in the handling device according to the invention and which are of the type shown in FIGS. 4–6, for further illustration of their function.

Reference numeral 13 designates a separating means which in the shown embodiment consists of a guide rule, which is elongate in the feeding direction and which at one end is mounted on the frame 4 by means of a connecting element 37. The guide rule extends between the wire bows in successively arranged carrier means. In the shown embodiment, the separating means are arranged in pairs for each row of taco shells. The rear end portion of the guide rule 13, seen in the feeding direction, exhibits an upper edge surface 14 which is inclined in relation to the path of travel of the taco shells so that, seen in the direction of travel, it is inclined upwards and is placed so that during transport the lower edges of the taco shells come into contact with the contact surface 14 and, in the subsequent feeding, the taco shells are caused to slide up the edge surface. The connection rod 11 extending through the top portions of the wire legs is formed with interruptions over the separating means 13 so that the carrier means can turn past the guide rule 13 at the end of the conveyor when they pass from the upper run of the driving means 8 to its lower run, as is seen in FIG. 1. In the movement of the carrier means 6, the taco shells are thus forced to make an upwardly directed displacement motion in relation to the carrier means, which implies that also taco shells that are sticking to the carrier means are actively loosened and can then move relatively easily on the carrier means. As a result, it is easy to handle the taco shells whether they are removed directly from the carrier means, when the latter turn down in connection with the transition from the upper run of the driving means 8 to its lower run, or lifted by some other means, such as shown for instance in FIGS. 1 and 3, by means of a second conveyor 2, arranged in connection with said first conveyor 1, for removing the taco shells from the first conveyor and passing on the taco shells to a delivery or collecting device 3. The conveyor 2 consists of a frame 15 which rotatingly supports a number of deflecting wheels 16–20, over which a number of transport chains 21–23 are laid, in the shown embodiment three. As an alternative, other types of flexible transport means, such as belt or band conveyors, could be arranged instead of the transport chains. Reference numeral 24 designates a number of drivers which are attached to the transport chains and suspended therefrom. The drivers are each provided with a support means, which in the shown embodiment is a support pin 25 which is movable in the respective drivers transversely of the direction of transport. These drivers and the associated movable support pins 25 are best seen in FIGS. 4–6. By the intermediary of an elbow 26, the drivers 24 are attached to the pivot pins 27 of the chain. Reference numerals 28 and 29 designate guide bars, which are supported by the frame 15 and adapted, with an inclined surface facing the drivers, to move the pins as the drivers are passing along the guide bar, from the disengaging position, which is shown in FIG. 5 and which is the retracted position in relation to the side 24a of the drivers 24 facing the taco shells, to the engaging position, which is shown in FIG. 6 and which is the projecting position. As appears from FIG. 2, the guide bars 28, 29 are secured to the frame at one of their ends and extend along the transport chain under the same and beside said drivers. Correspondingly, at the opposite side of the respective drivers, similar guide bars can be arranged, preferably above the upper run of the chain conveyors to return the support pins to the inactive position shown in FIG. 5.

Reference numeral 30 designates a control station, at which a number of sensors 31 detect whether the passing baked products fulfil predetermined criteria. These criteria may, for instance, refer to size, shape, surface quality, etc. Reference numeral 32 designates a station for the reception of baked products that have been rejected, for instance, due to deficient quality.

Reference numeral 33 indicates an abutment means for initiating separation of the baked product from the conveyor and delivery of the same to a collecting device 3. In the shown example, the collecting device 3 consists of a number of vertical conveyors 34 having a number of support arms 35 which are arranged to be fed down successively by means of the respective conveyors 34 as new baked products are added.

Below, the function of the shown device will be described in greater detail.

Stiff baked products, for instance taco shells 12, are supplied by the conveyor 1 while hanging over the ridge-shaped carrier means. As the carrier means move in the direction of the arrow 7, the lower edge of the baked products are brought into contact with the guide rules 13 and slide upwards along their upper guide edge 14. This guide edge is suitably shaped to match the shape of the baked products so that the often fragile edge of the baked products is not damaged in the sliding motion. As the feeding proceeds, a distance forms between the top portion 6b of the carrier means and the baked product. The second conveyor 2 is suitably synchronised in relation to the first conveyor so that the drivers 24 follow the baked products, the support pin 25 being aligned with the distance formed over the ridge of the carrier means between the carrier means and the baked product. Furthermore, the respective guide bars 28, 29 are oriented so that the support pin 25 in the continued feeding motion is successively introduced into the space formed due to this distance so that the baked product can be completely lifted away from the carrier means in the further transport thereof. Subsequently, the transport of the baked products proceeds as seen in FIG. 1, the baked products being arranged in pendulum fashion over support pins which are introduced from each side of the baked product. In this condition, the baked products are caused to pass the control station 30 and sensors 31 arranged thereon. The baked products that do not fulfil predetermined criteria are separated from the conveyor in a suitable manner, for instance by being crushed, and removed via the collecting device 32, which can, for instance, have an upper funnel-shaped inlet end and an outlet pipe arranged thereunder. Then the baked products are passed on to abut against the abutment means 33, the baked products being caused to pivot on the support pins. The abutment means 33 is a guide bar, which successively increases the pivoting angle of the baked products until they fall down into a collecting pocket in the collecting device 3. By this device, the baked products, which in the shown embodiment are primarily intended to be taco shells, are collected in an inverted position in relation to the hanging position. A suitable number of baked products are collected at a time, whereupon the stacked baked products are passed on, preferably automatically, for instance to be packaged. When returning the drivers, they are caused to pass additional guide bars which return the support pins to their initial position, which is shown in FIG. 5 and in which they are prepared to receive new baked products.

Although the handling device which is shown and described above is primarily intended for use in connection with taco shells, other similar baked products can, of course, also be handled, such as different types of thin biscuits. Admittedly, the shown taco shells are substantially U-shaped, but the device for separating the baked products from the first conveyor can also be used for separating baked products having another shape. These baked products can also be folded twice and, for instance, have a cup-shape. In that case, the carrier means suitably have another shape than that shown. Preferably, the carrier means are then adapted to the shape of the baked product. The cup-shape may have upwardly as well as downwardly facing concavity. In the shown embodiment, the baked products are fed in two parallel rows, but the conveyor can, of course, be designed to feed single rows of baked products as well as more than two rows of baked products. In the shown embodiment, the upper conveyor has a transport chain 22, which is shared by two adjacent rows and to which adjacent drivers of two adjacent rows of baked products are jointly attached. It goes without saying that it is also possible to arrange double transport chains, i.e. separate transport chains for the different rows of baked products, at this location. In the latter case, there is a greater degree of freedom as concerns the location of the attachment of the guide bars to the frame. On the other hand, the arrangement of common chains for two adjacent rows of baked products is a constructional simplification of the device. It is likewise feasible to arrange separate guide bars instead of a common guide bar 29 for two adjacent rows of baked products. Instead of providing the motion of the support pins mechanically by using guide bars, as in the shown embodiment, this motion may also be provided in some other way, for instance automatically, hydraulically or electrically. Each support pin can have its own actuator with suitable control devices for activating the support pins at a suitable point of time during the feeding motion, for instance, projecting the support pins when the above-described distance has been obtained between the baked product and carrier means in question. Instead of introducing a support pin from each side of the baked product, it is possible to introduce a carrier means from only one side of the baked product. The devices for gripping the baked product and lifting the same from the carrier means 6 can also be of a completely different kind within the scope of the invention. Support means can, for instance, be formed as some kind of gripping pliers which can grip the baked products either from the inside similarly to the support pins or from the outside, suitably with a wide engagement surface to prevent the baked products from collapsing. The separating means 13 can amount to a number other than that shown in the drawings and they can also, within the scope of the invention, have another design than that of a guide rule. The separating means can, for instance, be a pusher which acts from below and optionally follows the conveyor and be arranged in connection with each carrier means. Such a pusher can be driven by devices which can work mechanically or pneumatically as well as electrically, in the latter case for instance by solenoid action. The guide edges 14 of the guide rules 13 suitably have a design that follows the shape of the baked products so that the baked products are subjected to as broad and gentle a load as possible to prevent the baked products from being destroyed due to the sliding motion to which they are exposed.

At the control station 30, baked products which do not satisfy the determined requirements can be sorted out. Suitable devices for releasing the support means can be arranged so that the baked products are let down directly into the collecting device 32, which thus forms a rejection unit.

Suitably, photocells are used for checking the geometry of the baked products and load cells for checking whether there are any doubled baked products.

Baked products having U-shape or V-shape are suitably stacked, preferably with the arched side (the ridge) downwards, in a selected number directly in a box or a package. This reduces the risk of breaking the baked products.

As already mentioned, the baked products can be of many different kinds, such as taco shells, crisps and/or thin biscuits.

The invention is not limited to the above-described embodiments, which are described and shown in the drawings for the purpose of exemplification, and the details thereof can be varied within the scope of the appended claims without departing from the inventive idea.

What is claimed is:

1. A method for separating and delivering baked products from a first conveyor, the baked products on the first conveyor resting on carriers corresponding to a shape of the baked products,
    causing a relative motion to be imparted to respective ones of the baked products in relation to the carriers by a separator being brought into contact with the respective ones of the baked products to separate the respective ones of the baked products from the carriers before they are delivered to a delivery station,
    at least locally distancing the respective ones of the baked products from the carriers to form an interspace,
    introducing a support into the interspace, and
    lifting the respective ones of the baked products from the carriers with respective supports for further transport and delivery to the delivery station.

2. A method as claimed in claim 1, further comprising passing the respective supports and the respective ones of the baked products lifted thereon to the delivery station by a second conveyor.

3. A method as claimed in claim 2, wherein the respective ones of the baked products are passed, arranged in pendulum fashion over respective supports and, before the delivery station, lower edge portions of the respective ones of the baked products are brought into contact with an abutment so that the respective ones of the baked products are pivoted on the respective supports sufficiently that they are allowed to slide off the respective supports into a collecting device.

4. A method as claimed in claim 1, comprising removing the respective ones of the baked products from the respective supports at the delivery station to form stacks with a predetermined number of baked products in each stack.

5. A method as claimed in claim 1, wherein the respective supports include horizontally arranged, retractable pins.

6. A method as claimed in claim 1, comprising, before the delivery station, causing the respective ones of the baked products to pass a control station for controlling predetermined quality parameters and, depending on the control result, choosing one of rejecting the respective ones of the baked products and allowing the respective ones of the baked products to pass on to the delivery station.

7. The method as claimed in claim 1, wherein separation of the baked products from the associated carrier means is effected by the baked product, during its transport motion, being caused to slide towards a surface portion of the separating means, which surface portion is inclined relative to the transport motion of the carrier means.

8. A device for separating and delivering baked products from a first conveyor, the baked products resting on carries corresponding to a shape of the baked products, the device comprising:

at least one separator adapted to be brought into contact with the baked products to separate the baked products from respective carriers; and at least one support arranged for taking over the baked products from the first conveyor and thereafter passing on the baked products, wherein the at least one support is controllably guidable to engage said baked products and is releasable therefrom, wherein the at least one support is supported by a second conveyor and is arranged to extend at least from one side of the each baked product into a space formed between the baked product and the carrier in order to lift the baked product away from the carrier and thereafter pass on the baked product.

9. A device as claimed in claim 8, wherein the support includes at least one sliding pin that is movable between a disengaged position and an engaged position, the at least one pin being actuatable by operating means for moving the pin from between the engaged position and the disengaged position.

10. A device as claimed in claim 9, wherein the operating means includes at least one stationary slide path with which at least a guide portion of the at least one pin is engageable and which is inclined relative to a path of motion of drivers arranged to support and impart motion to the at least one pin, the driver being conveyed by the second conveyor.

11. A device as claimed in claim 8, wherein the second conveyor supports the baked products which are arranged in pendulum fashion over the support, the second conveyor having an abutment arranged in a path of motion of hanging portions of the baked products, and a collecting device arranged to receive baked products sliding off the support means.

12. A device as claimed in claim 8, wherein the support is controllably introducible into and retractable from a driver connected with the second conveyor.

13. A device as claimed in claim 8, comprising a load cell for detecting a weight of baked products hanging over a respective support.

14. A device as claimed in claim 8, comprising a control station having sensors sensing characteristics of the baked products.

15. A device as claimed in claim 14, comprising devices for separating and removing baked products which have been indicated by the sensors to lack at least one characteristic.

16. A device as claimed in claim 9, wherein the second conveyor supports the baked products which are arranged in pendulum fashion over the support, the second conveyor having an abutment arranged in a path of motion of hanging portions of the baked products, and a collecting device arranged to receive baked products sliding off the support means.

17. A device as claimed in claim 10, wherein the second conveyor supports the baked products which are arranged in pendulum fashion over the support, the second conveyor having an abutment arranged in a path of motion of hanging portions of the baked products, and a collecting device arranged to receive baked products sliding off the support means.

18. A device as claimed in claim 8, wherein the separator has a guiding edge portion that is inclined relative to a path of motion of the carrier and which is arranged to form a sliding bar that is engageable with the baked products during the transport thereof on the carrier means.

* * * * *